(12) United States Patent
Norman et al.

(10) Patent No.: US 7,595,391 B2
(45) Date of Patent: Sep. 29, 2009

(54) CROSSLINKED POLYSACCHARIDES AND METHODS OF MAKING AND USING CROSSLINKED POLYSACCHARIDES

(75) Inventors: Lewis R. Norman, Duncan, OK (US); Joseph R. Carlise, Atlanta, GA (US); Javier Jesus Concepcion Corbea, Atlanta, GA (US); William S. Rees, Jr., Snellville, GA (US); Marcus Weck, Atlanta, GA (US)

(73) Assignee: Halliburton Energy Services, Inc., Duncan, OK (US)

( * ) Notice: Subject to any disclaimer, the term of this patent is extended or adjusted under 35 U.S.C. 154(b) by 486 days.

(21) Appl. No.: 10/717,680

(22) Filed: Nov. 20, 2003

(65) Prior Publication Data

US 2005/0112077 A1    May 26, 2005

(51) Int. Cl.
*C08B 1/00* (2006.01)
*C08B 11/08* (2006.01)
*C08B 37/00* (2006.01)
*C07H 1/00* (2006.01)

(52) U.S. Cl. .......................... 536/56; 536/96; 536/114; 536/124

(58) Field of Classification Search ............... 536/56, 536/96, 114, 124
See application file for complete search history.

(56) References Cited

U.S. PATENT DOCUMENTS

| | | | | |
|---|---|---|---|---|
| 2,520,609 | A | * | 8/1950 | Morgan ....................... 536/31 |
| 5,002,125 | A | * | 3/1991 | Phillips et al. .............. 166/271 |
| 5,888,927 | A | * | 3/1999 | McCulloch et al. ......... 502/407 |
| 6,649,591 | B2 | * | 11/2003 | Lai .............................. 514/6 |

* cited by examiner

*Primary Examiner*—Shaojia Anna Jiang
*Assistant Examiner*—Everett White
(74) *Attorney, Agent, or Firm*—Robert A. Kent; Baker Botts L.L.P.

(57) ABSTRACT

This invention relates to methods of crosslinking polysaccharides to form crosslinked polysaccharides, and more particularly, to crosslinked polysaccharides that may be incorporated in fluids useful in, for example, applications requiring a crosslinked viscoelastic gel. In one embodiment, the present invention provides a method of crosslinking a polysaccharide comprising the steps of: providing a metal coordinating group having a reactive site, derivatizing a polysaccharide with the metal coordinating group to produce a derivatized polysaccharide having bidentate ligands, and crosslinking the derivatized polysaccharide having bidentate ligands with a metal ion to form a metal ligand coordination complex.

20 Claims, No Drawings

CROSSLINKED POLYSACCHARIDES AND METHODS OF MAKING AND USING CROSSLINKED POLYSACCHARIDES

BACKGROUND OF THE INVENTION

1. Field of the Invention

This invention relates to methods of crosslinking polysaccharides to form crosslinked polysaccharides, and more particularly, to crosslinked polysaccharides that may be incorporated in fluids useful in, for example, applications requiring a crosslinked viscoelastic gel.

2. Description of the Prior Art

Polysaccharides are carbohydrates in which tens, hundreds, or even thousands of simple sugars are linked together. Since they have no free anomeric hydroxyls (except for one at the end of the chain), they are not reducing sugars and do not show mutarotation. Cellulose, starch, and various galactomannans are some of the most-widely occurring polysaccharides. Polysaccharides are commonly used to viscosify aqueous fluids to create, e.g., viscosified treatment fluids that inhibit particle settling by virtue of viscosity. If the polysaccharide is crosslinked, these viscosified treatment fluids can approach near zero particle settling rates.

Such viscosified treatment fluids are often used in industries such as the mining, explosive, and petroleum industries. For instance, in petroleum recovery applications such as drilling, hydraulic fracturing, and gravel packing, such fluids are used to carry particulates into a subterranean formation for various purposes. In hydraulic fracturing operations, viscosified treatment fluids are used to stimulate the formation. The viscosified fluid carries and deposits a propping agent through the wellbore and into fractures in the formation. Once the desired deposition has occurred, the viscosity of the treatment fluid is reduced, the treatment fluid is returned to the surface, and the proppant is left in the formation, inter alia, to maintain the integrity of the fracture.

In gravel packing operations, a pack of gravel is placed on the exterior of a perforated or slotted liner or screen which is positioned across an unconsolidated formation. The resultant structure, inter alia, presents a barrier to migrating formation fines but allows formation fluids to flow to the well bore. The gravel is carried to the formation in the form of a slurry by mixing gravel with a viscosified treatment fluid. Once the gravel pack is placed in the wellbore, the viscosity of the treatment fluid is reduced, and it is returned to the surface.

To increase the viscosity of the viscosified fluid, the polysaccharide component of the fluid may be crosslinked. Conventional crosslinking agents comprise aluminum, titanium, zirconium, and boron. The crosslinking behavior of these conventional crosslinking agents, however, may be difficult to control, and the resultant viscosity of the fluid may be unpredictable. Being able to predict how the crosslinking will occur provides for control of the ultimate viscosity of the treatment fluid. The primary means of trying to control the crosslinking behavior of these conventional agents involves varying the concentration of the crosslinker in the composition and the pH of the composition at a given temperature, which can be subject to great variability and human error. For example, if too much crosslinking agent is added or if the pH is too low or too high, then the viscosity of the treatment fluid may be adversely affected. Even employing such techniques has not provided the desired level of predictability for the ultimate viscosity of the treatment fluid.

Also, the crosslinking behavior of such conventional crosslinking agents may become inhibited by components in the treatment fluid. For example, the composition of the water component of an aqueous treatment fluid can interfere with the crosslinking behavior of conventional crosslinking agents. Moreover, such conventionally crosslinked polysaccharides may be heavily dependent on conditions such as pH and temperature. Because of this dependency and resultant instability, the viscosified treatment fluid may lose its viscosity prematurely, for instance, the proppant or gravel can drop out of a conventional viscosified treatment fluid before it has been placed in the desired interval in the subterranean formation neighboring the well bore.

SUMMARY OF THE INVENTION

This invention relates to methods of crosslinking polysaccharides to form crosslinked polysaccharides, and more particularly, to crosslinked polysaccharides that may be incorporated in fluids useful in, for example, applications requiring a crosslinked viscoelastic gel.

In one embodiment, the present invention provides a method of crosslinking a polysaccharide comprising the steps of: (a) providing a metal coordinating group having a reactive site, (b) derivatizing a polysaccharide with the metal coordinating group to produce a derivatized polysaccharide having bidentate ligands, and (c) crosslinking the derivatized polysaccharide having bidentate ligands with a metal ion to form a metal ligand coordination complex.

The objects, features and advantages of the present invention will be readily apparent to those skilled in the art upon a reading of the description of the preferred embodiments which follows.

DESCRIPTION OF PREFERRED EMBODIMENTS

This invention relates to methods of crosslinking polysaccharides to form crosslinked polysaccharides, and more particularly, to crosslinked polysaccharides that may be incorporated in fluids useful in, for example, applications requiring a crosslinked viscoelastic gel. More specifically, the present invention provides a method of derivatizing polysaccharides with bidentate-type metal coordinating ligands, and subsequent crosslinking of those derivatized polysaccharides to form metal ion crosslinked polysaccharides useful in providing viscosified fluids. These viscosified fluids may be useful in any application requiring a crosslinked viscoelastic gel, such as petroleum recovery operations including but not limited to, stimulation, gravel packing, temporary plugging agents, and the like. The crosslinking methods provided herein, inter alia, provide heretofore unknown predictability regarding crosslinking of polysaccharides.

The metal ion crosslinked polysaccharides of the present invention are formed through coordination chemistry involving metal ions by attaching metal-coordinating ligands to the polymer backbone. Polysaccharides suitable for use in the present invention include but are not limited to guar, xanthan, locust bean gum, hydroxyethyl and hydroxypropyl derivatives of gums, and hydroxyethylcellulose. The term "polysaccharide" as used herein refers to and includes each of these compounds. In the present invention, metals may be used as the crosslinking agent, some of which heretofore have not been effective in crosslinking such polysaccharides. Suitable crosslinking agents include but are not limited to copper, nickel, iron, ruthenium, palladium, platinum, iridium and cobalt. In certain preferred embodiments, guar is the polysaccharide and iron is the crosslinking agent.

The crosslinking methods of the present invention generally comprise three steps: providing a metal-coordinating group having a reactive site, derivatizing a polysaccharide such that the reactive site on the metal coordinating group is linked to a polymer chain of the polysaccharide to create a derivatized polysaccharide having a bidentate-type ligand, and crosslinking the derivatized polysaccharide having a bidentate-type ligand by forming a metal ligand coordination complex. Bidentate ligands as used herein refers to Lewis bases that donate two pairs of electrons to a metal atom to form a 5, 6, or 7 member ring. In this invention, this does not include carboxylates. Bidentate ligands are often referred to as chelating ligands ("chelate" is derived from the Greek word for "claw") because, inter alia, they can "grab" a metal atom in two places. Some bidentate ligands that are suitable for use in conjunction with the present invention include but are not limited to ethylenediamine, acetylacetonate ions, dithiocarbamate, 2,2'-bipyridine, 1,10-phenanthroline, and 8-hydroxyquinolinato. When reacted with a metal, the bidentate ligands form a metal coordination complex. Suitable metal ions that may be used in the present invention include but are not limited to copper, nickel, iron, ruthenium, palladium, platinum, iridium and cobalt. All three reactions occur under conditions suitable for each particular reaction to occur, and will be apparent to one of ordinary skill in the art with the benefit of this disclosure.

The amount of metal crosslinking agent required depends on the particular metal ion utilized and the stability constant of the metal ligand coordination complex. Generally speaking, the higher the stability constant of the metal ligand complex, the stronger the crosslink. Generally, a sufficient amount of metal crosslinking agent is used to obtain the desired amount of crosslinked polysaccharide to get the desired viscosity of the treatment fluid. In some embodiments, a molar ratio of at least 2 moles of the metal coordinating group to 1 mole of polysaccharide is required to achieve the desired effect. In certain embodiments, the molar ratio can vary to include up to about 500 moles of metal-coordinating group per mole of polysaccharide. One of ordinary skill in the art with the benefit of this disclosure will be able to identify the appropriate metal complex for a given application and a range of appropriate molar ratios for the application.

The crosslinking reaction of the present invention that produces the metal ion crosslinked polysaccharides can occur before the treatment fluid is placed downhole, as the treatment fluid is placed downhole, or it can be a delayed reaction, depending on the desired application. In one embodiment, the delayed crosslink could occur as the fluid is exiting the wellbore. With the fluid in the wellbore in an uncrosslinked state, the pumping pressure may be minimized. The crosslink, inter alia, is required to create a polymer network that can suspend the sand in the low shear-rate conditions which may be present in the fracture.

To facilitate a complete understanding of the present invention, the following description and equations relating to two preferred embodiments are given. It is to be understood that such specificity is not to be construed as defining or in any way limiting the scope of the invention, but is intended to aid in a general understanding of the crosslinking methods presented herein. The following description is not intended to define the invention.

Equations 1 through 3 illustrate one exemplary embodiment of the present invention. Specifically, Equation 1 illustrates the formation of an epoxide which is a metal-coordinating group having a reactive site; Equation 2 illustrates linking the metal-coordinating group to the polysaccharide, in this instance, a guar polymer chain, by reaction of a hydroxyl group with the epoxide to create a derivatized guar polymer; and Equation 3 illustrates crosslinking of two derivatized guar polymer chains by coordination of two metal-coordinating groups to a single metal ion. The equations presented below are meant to be representative in character. More particularly, Equation 1 outlines a preparation of a 1,10-phenanthroline-5,6-epoxide bidentate ligand, which can be attached to polysaccharides such as guar as shown in Equation 2, and crosslinked via metal ion coordination as shown in Equation 3.

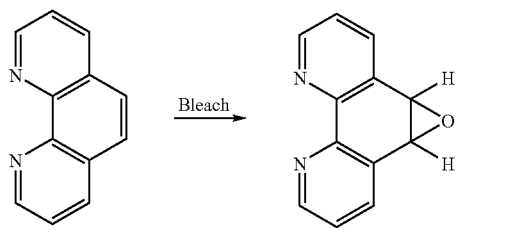

Equation 1

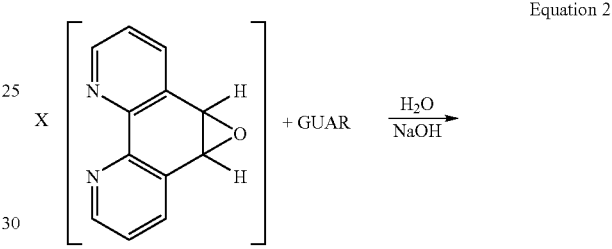

Equation 2

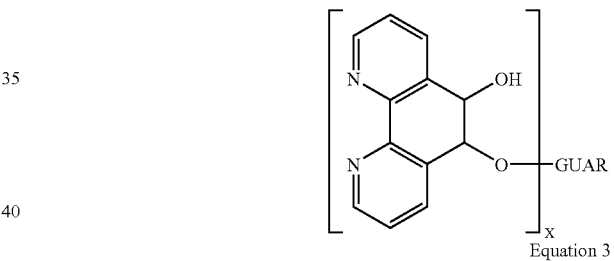

Equation 3

In another exemplary embodiment of the present invention, bidentate ligands based on 2,2'-bipyridine can be attached to oligo- and/or polysaccharides, which allows for crosslinking with a variety of metal ions such as iron, ruthenium, copper, or the like. Equation 4 outlines the preparation of 2,2'-bipyridinyl-4,4'-dicarbonyl chloride, which can be attached to polymers such as polysaccharides, and crosslinked via metal ion coordination chemistry as shown in Equation 5. Equation 4 shows the linking of the metal-coordinating group to the polysaccharide polymer, in this instance guar, by reaction of the acid chlorides with hydroxyl groups on the polymer chain. Equation 5 similar to Equation 3 above illustrates the crosslinking of two polysaccharide polymer chains by coordination of two metal-coordinating groups to a single metal ion. Equations 3, 4, and 5 are intended to be only representational in character.

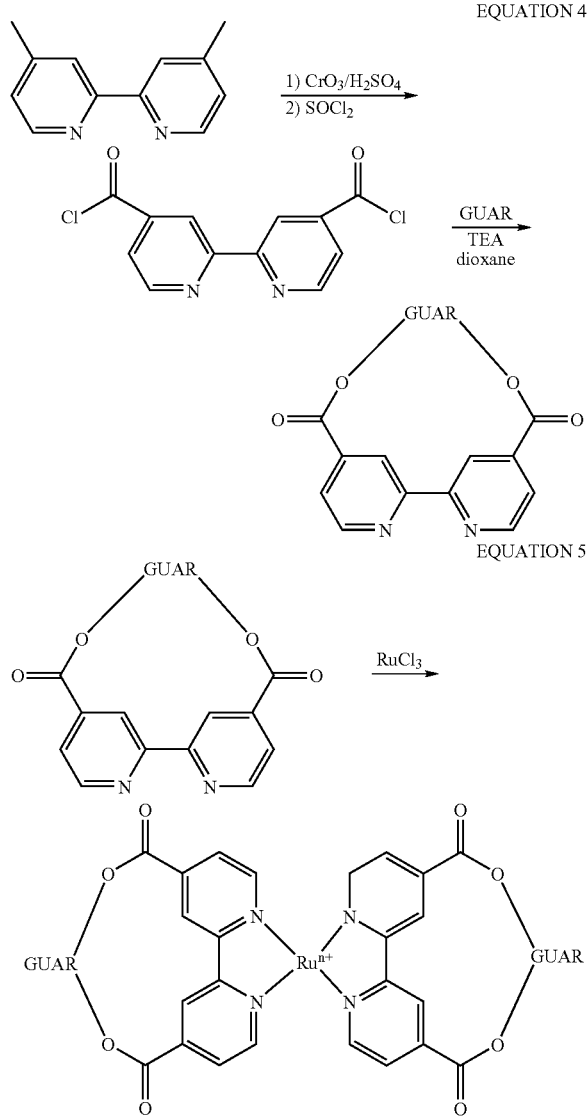

EQUATION 4

EQUATION 5

The metal ion crosslinked polysaccharides of the present invention may be used in a viscosified treatment fluid in applications requiring a viscosified treatment fluid, such as petroleum recovery operations including hydraulic fracturing or gravel packing in well bores penetrating subterranean formations. Treatment fluids comprising these metal ion crosslinked polysaccharides of the present invention are particularly suitable for subterranean formations having a wide range of temperatures.

To create the treatment fluid comprising the crosslinked polysaccharides of the present invention, an aqueous fluid may be used to solubilize the polysaccharides. The term "aqueous fluid" as used herein means any fluid comprising sufficient water to at least partially hydrate the polysaccharide and result in an increase in the viscosity of the fluid. Aqueous fluids used in petroleum recovery operations normally contain sodium chloride, potassium chloride, calcium chloride, sodium bromide, and other bromides, tetramethylammonium chloride or the like to weight the fluid and/or inhibit the swelling of clays generally found in subterranean formations; such aqueous fluids are suitable in the present invention. One should note, however, that to achieve certain beneficial effects of the present invention, the pH of the aqueous fluid should be compatible with the selected metal ion crosslinked guar polymer, and should not adversely affect hydration of the polymer. The treatment fluids of the present invention may contain any other additives such as gel stabilizers, breakers, clay stabilizers, bactericides, fluid loss additives, and the like, provided that such additives do not adversely react with the treatment fluid or the polysaccharide to prevent its use in the desired manner.

An example of a method of crosslinking a polysaccharide of the present invention comprises the steps of: providing a metal coordinating group having a reactive site; derivatizing a polysaccharide with the metal coordinating group to produce a derivatized polysaccharide having bidentate ligands; and crosslinking the derivatized polysaccharide having bidentate ligands to form a metal ion crosslinked polysaccharide. An example of a method of fracturing a subterranean formation of the present invention comprises the steps of: providing a treatment fluid comprising a metal ion crosslinked polysaccharide, the metal ion crosslinked polysaccharide being made by a method comprising the steps of: providing a metal coordinating group having a reactive site, derivatizing a polysaccharide with the metal coordinating group to produce a derivatized polysaccharide having bidentate ligands, and crosslinking the derivatized polysaccharide having bidentate ligands to form a metal ion crosslinked polysaccharide; and placing the treatment fluid into a wellbore at a chosen pressure to create or enhance a fracture in the subterranean formation. Optionally, the treatment fluid may comprise proppant.

An example of a method of providing sand control in a well bore penetrating a subterranean formation utilizing a metal ion crosslinked polysaccharide of the present invention comprises the steps of (a) providing a treatment fluid comprising gravel and a metal ion crosslinked polysaccharide, the metal ion crosslinked polysaccharide being made by a method comprising the steps of (i) providing a metal coordinating group having a reactive site; (ii) derivatizing a polysaccharide with the metal coordinating group to produce a derivatized polysaccharide having bidentate ligands, and (iii) crosslinking the derivatized polysaccharide having bidentate ligands to form a metal ion crosslinked polysaccharide; and (b) placing the treatment fluid into an annulus between the well bore and the neighboring subterranean formation so as to form a gravel pack in the annulus.

To facilitate a better understanding of the present invention, the following examples of preferred embodiments are given. In no way should such examples be read to limit the scope of the invention.

EXAMPLES

Example 1

Synthesis of 1,10-phenanthroline-5,6-epoxide. A mixture of 300 ml of commercial bleach and 200 ml of distilled water was adjusted to a pH of 8.2 to 8.3 with concentrated hydrochloric acid. To this solution, 1.90 grams of 1,10-phenanthroline, and 1.67 grams of tetra n-butyl ammonium hydrogensulfate dissolved in 167 ml of chloroform were added. The resultant mixture was vigorously stirred for 1 hour. The reaction was followed by $^1$H-NMR ($CDCl_3$), which disclosed the appearance of a singlet at 4.6 ppm and disappearance of the singlet at 7.7 ppm. The organic phase was separated, washed three times with 200 ml of water and 200 ml of brine (e.g., saturated NaCl solution), then dried over anhydrous magnesium sulfate. Removal of the solvent under vacuum yielded the title compound as a yellow powder. Approximately 1.97 grams were recovered, at a 95% yield. This may be recrystallized from a 5:1 mixture of dichloromethane: pentane, approximately 10 ml.

Derivatization of guar with 1,10-phenanthroline-5,6-epoxide. To a vigorously stirred solution of 2.5 grams of guar in 500 ml distilled water, 3 ml of 2% NaOH and 136 mg of 1,10-phenanthroline-5,6-epoxide were added. After stirring overnight, the solution was added to 500 ml of acetone to precipitate the derivatized guar. The liquid was decanted and the solid was filtered through a frit, washed with acetone, and air-dried. The white fibers were powdered with mortar and pestle in the presence of acetone to yield a fine powder which was filtered and air dried. The yield was 2.3 grams.

Crosslinking with a metal salt. 250 mg of derivatized guar were dissolved in 50 ml of distilled water by stirring overnight. Preferably, the guar should be completely dissolved. About 10 mg of iron (II) sulfate in 1 ml of water was added to the guar solution with stirring, resulting in immediate crosslinking. This was a qualitative test for crosslinking to produce an elastic gel.

Example 2

Synthesis of 2,2-bipyridinyl-4,4'-dicarboxylic acid. Approximately 1 gram (5.43 mmol) 4,4'-dimethyl-2,2'-bipyridine was added to 40 ml of concentrated $H_2SO_4$. The solution was cooled to 0° C., and 3.3 grams of $CrO_3$ was added slowly, forming a yellow solution. The solution was stirred for two days, after which the solution had turned dark green, and was then poured into ice water. A green precipitate formed that was filtered off and washed with water. The precipitate was then suspended in 50 ml water followed by the addition of a 10 M solution of KOH until the solution was basic, about pH equal to or greater than 8. The solution was filtered, the filtrate containing the desired product. The solution was acidified with HCl to precipitate the diacid product as a white solid, which was washed with water, methanol, and ether, and then dried to yield 1.017 grams of product, which was 77% of the theoretical yield.

Synthesis of 2,2'-bipyridinyl-4,4'-dicarbonyl chloride. A solution of 1.017 grams of 2,2'-bipyridinyl-4,4'-dicarboxylic acid and 20 ml of thionyl chloride was refluxed for 3 hours. The excess thionyl chloride was distilled off and the remaining orange solid was dried under a vacuum (20 mTorr) for 3 hours to give the diacid chloride, which was used immediately.

Derivatization of guar with 2,2'-bipyridinyl-4,4'-dicarbonyl chloride. About 958 mg of dry guar and 2 ml of triethylamine were added to 15 ml of dry dioxane and stirred. A solution of 2,2'-bipyridinyl-4,4'-dicarbonyl chloride (0.11 ml of a 0.59 M solution in dioxane) was added to the guar mixture slowly, and allowed to stir for 8 hours. The solution was removed from stirring, and aliquots were used directly in the following step.

Crosslinking of functionalized guar by addition of ruthenium metal salt solution. A 0.48% solution of derivatized guar was prepared by dissolving 0.5 ml of the solution from the previous step in 9.5 ml of water. The pH was adjusted to 4.5 to 5.0 to solubilize the guar. Then a solution of 0.44 mg $RuCl_3$ in 0.124 ml water was added, and the vial was shaken for 1 minute, and then allowed to sit for an additional ten minutes. Apparent viscosity had increased to the point where significant lipping was occurring.

Example 3

Comparison of metals for crosslinking phenanthroline-fictionalized guar. A solution of 0.50 g of phenanthroline-derivatized guar (15:1 mannose:phenanthroline) was dissolved in 100 ml of water and allowed to hydrate overnight. Crosslinker solutions were prepared by dissolving the metal salts in water to achieve a concentration of 88 mM. Crosslinker solution (75 μl for 2:1 ligand: metal molar ratio, or 150 μfor 1:1 ligand: metal molar ratio) was added to 10 ml aliquots of the polymer solution using an automatic pipette and shaken to mix. Crosslinking occurred within minutes except when using $RuCl_3$, which required several hours to crosslink. The elastic modulus, G', was determined using a Haake RheoStress RS 150 viscometer fitted with a 60 mm diameter, 2° angle cone and plate. An oscillatory stress sweep from 0.05 Pa to 30 Pa was run at a constant frequency of 1 Hz and 23° C.

TABLE 1

| Metal salt | Ligand:metal | Elastic Modulus G' in Pa at stress indicated | | |
|---|---|---|---|---|
| | | 0.1 Pa | 1 Pa | 11 Pa |
| None | — | 0.09 | 0.04 | 0.001 |
| $CoCl_2$ | 2:1 | 0.20 | 0.15 | 0.03 |
| $CoCl_2$ | 1:1 | 0.16 | 0.11 | 0.02 |
| $CuCl_2$ | 2:1 | 0.83 | 0.56 | 0.38 |
| $CuCl_2$ | 1:1 | 1.18 | 0.73 | 0.40 |
| $FeSO_4$ | 2:1 | 4.88 | 4.34 | 2.45 |
| $FeSO_4$ | 1:1 | 1.88 | 1.27 | 0.87 |
| $RuCl_3$ | 1:1 | 5.93 | 6.30 | 5.21 |

Thus, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of crosslinking a polysaccharide comprising the steps of:
   (a) providing a metal coordinating group having a reactive site, (b) derivatizing a polysaccharide with the metal coordinating group to produce a derivatized polysaccharide having bidentate ligands that comprise 2,2'-bipyridine, and (c) crosslinking the derivatized polysaccharide having bidentate ligands with a metal ion to form a metal ligand coordination complex.

2. The method of claim 1 wherein the polysaccharide is selected from the group consisting of guar, xanthan, locust bean gum, hydroxy ethyl and hydroxy propyl derivatives of gums, hydroxyethylcellulose, and combinations thereof.

3. The method of claim 1 wherein the derivatized polysaccharide having bidentate ligands is crosslinked with a crosslinking agent comprising a compound chosen from the group consisting of copper, nickel, iron, ruthenium, palladium, platinum, iridium, cobalt, and combinations thereof.

4. The method of claim 3 wherein the crosslinking agent is present in an amount up to about 500 moles of crosslinking agent per mole of polysaccharide.

5. The method of claim 3 wherein step (c) occurs within a wellbore in a subterranean formation.

6. The method of claim 3 wherein the polysaccharide comprises guar and the crosslinking agent is a derivative of iron or ruthenium.

7. A metal ion crosslinked polysaccharide produced by a method comprising the steps of:
(a) providing a metal coordinating group having a reactive site on the metal coordinating group,
(b) derivatizing a polysaccharide with the metal coordinating group to produce a derivatized polysaccharide having bidentate ligands that comprise 2,2'-bipyridine, and
(c) crosslinking the derivatized polysaccharide having bidentate ligands to form a metal ion crosslinked polysaccharide.

8. The metal ion crosslinked polysaccharide of claim 7 wherein the polysaccharide is selected from the group consisting of guar, xanthan, locust bean gum, hydroxy ethyl and hydroxy propyl derivatives of gums, hydroxyethylcellulose, and combinations thereof.

9. The metal ion crosslinked polysaccharide of claim 7 wherein the derivatized polysaccharide having bidentate ligands is crosslinked with a crosslinking agent comprising a compound chosen from the group consisting of copper, nickel, iron, ruthenium, palladium, platinum, iridium, cobalt, and combinations thereof.

10. The metal ion crosslinked polysaccharide of claim 9 wherein the crosslinking agent is present in an amount up to about 500 moles of crosslinking agent per mole of polysaccharide.

11. The metal ion crosslinked polysaccharide of claim 9 wherein step (c) occurs within a wellbore in a subterranean formation.

12. The metal ion crosslinked polysaccharide of claim 9 wherein the polysaccharide comprises guar and the crosslinking agent is a derivative of iron or ruthenium.

13. A method of crosslinking a polysaccharide comprising the steps of:
(a) providing a metal coordinating group having a reactive site,
(b) derivatizing a polysaccharide with the metal coordinating group to produce a derivatized polysaccharide having bidentate ligands that comprise at least one bidentate ligand selected from the group consisting of: 2,2'-bipyridine; 1,10-phenanthroline; 8-hydroxyquinolinato; and any combination thereof, and
(c) crosslinking the derivatized polysaccharide having bidentate ligands with a metal ion to form a metal ligand coordination complex.

14. The method of claim 13 wherein the polysaccharide is selected from the group consisting of guar, xanthan, locust bean gum, hydroxy ethyl and hydroxy propyl derivatives of gums, hydroxyethylcellulose, and combinations thereof.

15. The method of claim 13 wherein the derivatized polysaccharide having bidentate ligands is crosslinked with a crosslinking agent comprising a compound chosen from the group consisting of copper, nickel, iron, ruthenium, palladium, platinum, iridium, cobalt, and combinations thereof.

16. The method of claim 15 wherein the crosslinking agent is present in an amount up to about 500 moles of crosslinking agent per mole of polysaccharide.

17. The method of claim 15 wherein step (c) occurs within a wellbore in a subterranean formation.

18. The method of claim 15 wherein the polysaccharide comprises guar and the crosslinking agent is a derivative of iron or ruthenium.

19. The method of claim 15 wherein the bidentate ligands comprise 1,10-phenanthroline.

20. The method of claim 15 wherein the bidentate ligands comprise 8-hydroxyquinolinato.

* * * * *

UNITED STATES PATENT AND TRADEMARK OFFICE
CERTIFICATE OF CORRECTION

PATENT NO.       : 7,595,391 B2                                    Page 1 of 1
APPLICATION NO.  : 10/717680
DATED            : September 29, 2009
INVENTOR(S)      : Norman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 616 days.

Signed and Sealed this

Twenty-eighth Day of September, 2010

David J. Kappos
*Director of the United States Patent and Trademark Office*